United States Patent [19]

Penter

[11] Patent Number: 4,902,313
[45] Date of Patent: Feb. 20, 1990

[54] APPARATUS AND METHOD OF REDUCING POLLUTION FOR TIRE BUFFING EQUIPMENT

[76] Inventor: Albert P. Penter, 427 Pintail Dr., Loveland, Ohio 45140

[21] Appl. No.: 334,821

[22] Filed: Apr. 17, 1989

[51] Int. Cl.$^4$ .............................................. B01D 47/12
[52] U.S. Cl. ......................................... 55/84; 55/94; 55/223; 98/36; 157/13
[58] Field of Search .................. 55/84, 93, 94, 223; 98/36, 115.1; 157/13

[56] References Cited

U.S. PATENT DOCUMENTS

| | | | |
|---|---|---|---|
| 3,614,973 | 10/1971 | Jensen et al. | 157/13 |
| 3,704,570 | 12/1972 | Gardenier | 55/84 |
| 3,880,061 | 4/1975 | Hensiek et al. | 98/115.1 |
| 3,888,145 | 6/1975 | Heaton et al. | 82/1 |
| 4,021,899 | 5/1977 | Jensen | 29/79 |
| 4,487,615 | 12/1984 | Taylor et al. | 55/84 |
| 4,576,613 | 3/1986 | Miline | 55/DIG. 29 X |

OTHER PUBLICATIONS

"CB50G", Cincinnati Retread Systems, Copr. 1985—advertisement.

Primary Examiner—Charles Hart
Attorney, Agent, or Firm—Biebel, French & Nauman

[57] ABSTRACT

An apparatus and a method of reducing pollution for tire buffing equipment by which a narrow air stream curtain is directed across the cutting width of a rasp immediately ahead of the tread grinding area to contain dust or other small tread materials particles emitted during buffing. Water in the form of a mist is directed between the air curtain and the rasp for mixing with the air to congeal or coagulate the dust and tread material particles into larger size particles which are more efficiently handled by an exhaust or collecting system.

14 Claims, 8 Drawing Sheets

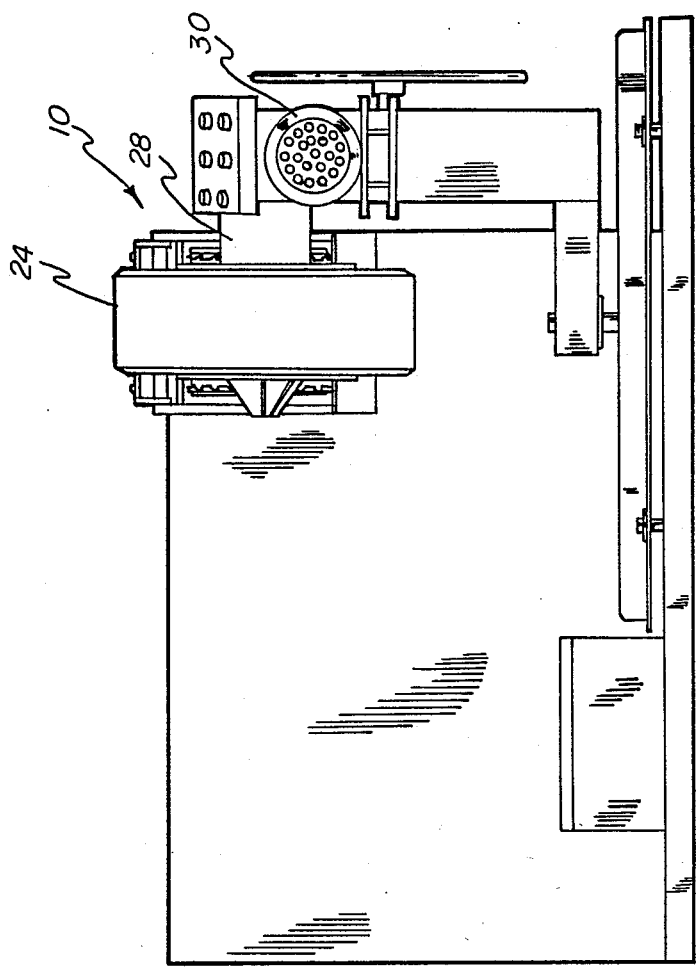

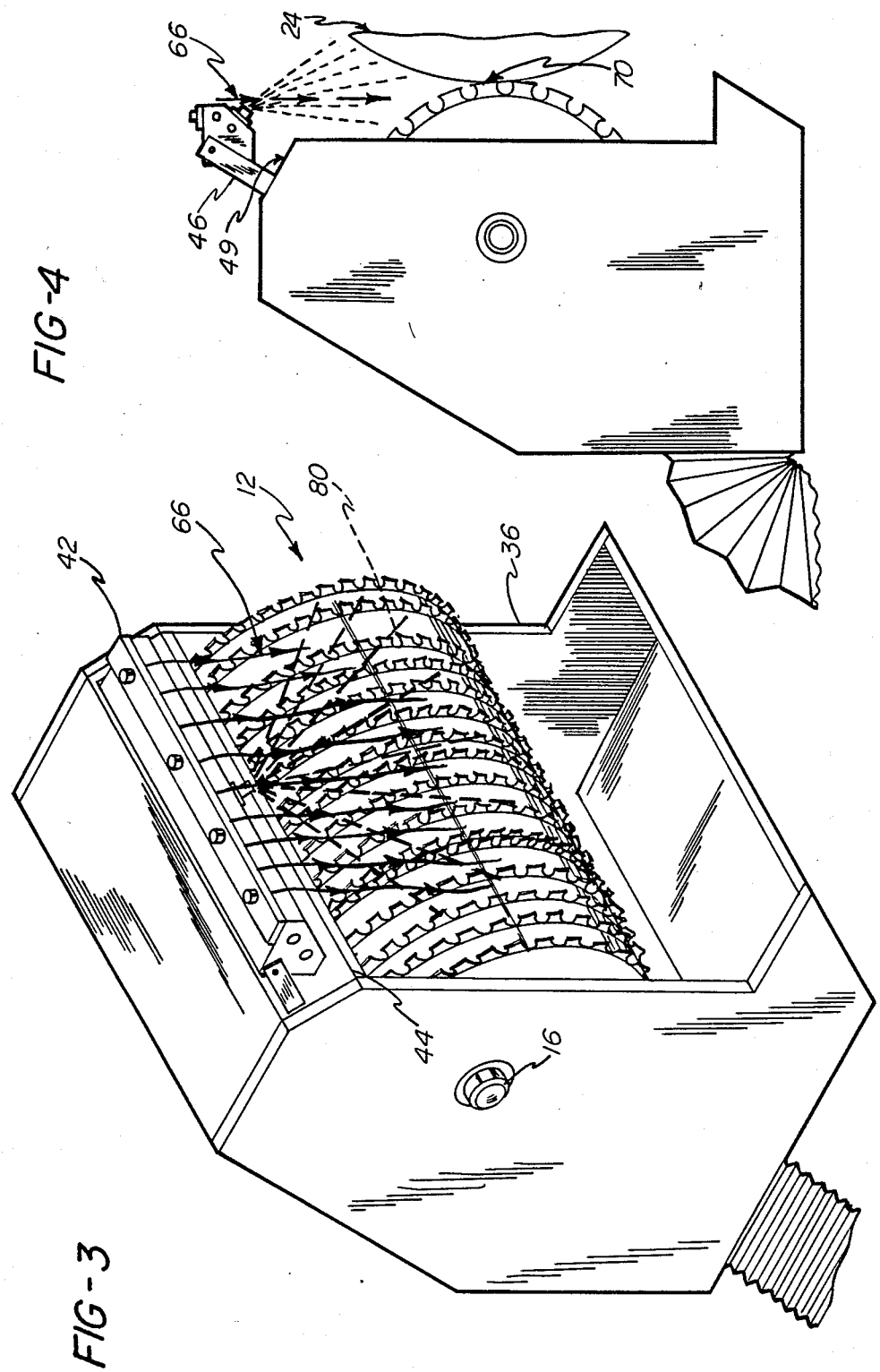

∝ a

∝ b

APPARATUS AND METHOD OF REDUCING POLLUTION FOR TIRE BUFFING EQUIPMENT

BACKGROUND OF THE INVENTION

This invention relates to tire buffing equipment, and more particularly, to an apparatus and method of reducing pollution such as smoke and the like emitted during the tire buffing stage of tire retreading.

The removing of tread material from tires is a well known procedure and is generally accomplished by first removing the old tread material and conditioning the remaining surface texture to accept the newly applied tread material. This is accomplished by abrading the periphery of the tire with an abrading member which may be in the form of a rasp having radially extending blades, barbs, or the like. The rasp is rapidly rotated and is moved into engagement with the tire to abrade, cut, rub, buff or otherwise effectively remove and/or wear off the old tread from the tire and condition the remaining surface for application of the new rubber or other material in which the new tread is formed.

In recent years tire manufactures have been using much finer grades of carbon black in tires as well as adding large quantities of oil. When removing the old tread material from these tires, the action of the rasp generates a considerable amount of friction, producing much smoke and other gaseous pollutants. In addition, particles ranging in the size from less than 100 microns to more than 1.5 centimeters in size can be emitted into atmosphere. Scorching of the tire surface caused by dull rasp blades or if the tire is insufficiently inflated or if the tire is not rigid can cause the new rubber not to properly adhere to the scorched tire surface and can result in premature tire failure.

As described in U.S. Pat. No. 3,614,973 to Jensen, it has been found that if the blades of the rasp are rotated through an atomized spray or mist of fluid, such as water, immediately ahead of their engagement with the tire then there is an advantageous cooling of the rasp. Some of the water will also be carried by the rotating rasp into the grinding area defined by the cutting or abrading action. As a result, the blades or teeth of the rasp will be effectively lubricated as they cut through the rubber tread of the tire so that friction is reduced and the temperature of the tread particles and dust is kept below a potential ignition point. The water also tends to congeal or coagulate powdery dust into larger size particles which are more efficiently handled by the exhaust or collecting system.

However, one problem with the previous methods of reducing the pollution emitted during tire buffing is that they require the use of large amounts of water while permitting smoke and fine particles to escape into the atmosphere.

Consequently, a need exists for an improved machine and method of reducing pollution such as smoke and the like emitted during tire buffing.

SUMMARY OF THE INVENTION

The present invention is a method and an apparatus for removing old tread material and conditioning worn tire carcasses in preparation for applying new tread material having means for reducing smoke and the like emitted into the atmosphere during tire rebuffing. In operation a tire is mounted on an expandable hub and placed into position for contacting the blades of a rotating rasp along a defined tread grinding area. A narrow air stream curtain is directed across the cutting width of the rasp and onto the blades immediately ahead of the tread grinding area. Then, a water mist is directed between the air curtain and the rasp blades for mixing with the air to congeal or coagulate the dust and tread particles created during buffing into larger size particles.

The tire buffing machine comprises an expandable hub means for receiving a tire; a rasp having a shroud; means for rotating the rasp; means for bringing the tire into engagement with the rotating rasp; and pollution reducing means mounted to the shroud, the pollution reducing means includes means for forming and directing an air curtain along a portion of the rasp and means for directing a water spray between the air curtain and the rasp.

The pollution reducing apparatus comprises a casing having an upper generally flat surface, an inner longitudinally extending air plenum, and an inner water passage; an inner plate extending longitudinally along the flat surface; a cover plate spaced from the flat surface by the inner plate, the cover plate and the flat surface forming a longitudinally extending slot in flow communication with the air plenum for directing a curtain of air across a portion of a tire buffing rasp; air supply means for supplying air under pressure to the plenum; water supply means for supplying water under pressure to the inner water passage; and nozzle means in flow communication with the inner water passage for directing a spray of water into the air curtain.

The primary object of this invention, therefore is to provide an improved buffing machine which reduces the amount of pollution escaping into the atmosphere; to reduce the amount of water required for tire buffing; to reduce blade friction thereby reducing the amount of smoke produced during buffing; to reduce the temperature of the dust and tread particles below their ignition point thereby eliminating potential fire hazards; and to reduce the possibility of scorching the tire surface.

Other objects and advantages of the invention will be apparent from the following description, the accompanying drawings and the appended claims.

DESCRIPTION OF THE DRAWINGS

FIG. 2 is a front elevation view showing the tire buffing machine with the tire in position for buffing;

FIG. 3 is a perspective view of the rasp of FIG. 1 and 2 showing the pollution reducing assembly;

FIG. 4 is a side view of the rasp of FIGS. 1 through 3;

FIG. 9 is a perspective view of the rasp similar to FIG. 3 showing a pair of nozzles.

DESCRIPTION OF THE PREFERRED EMBODIMENTS

Figure 1:
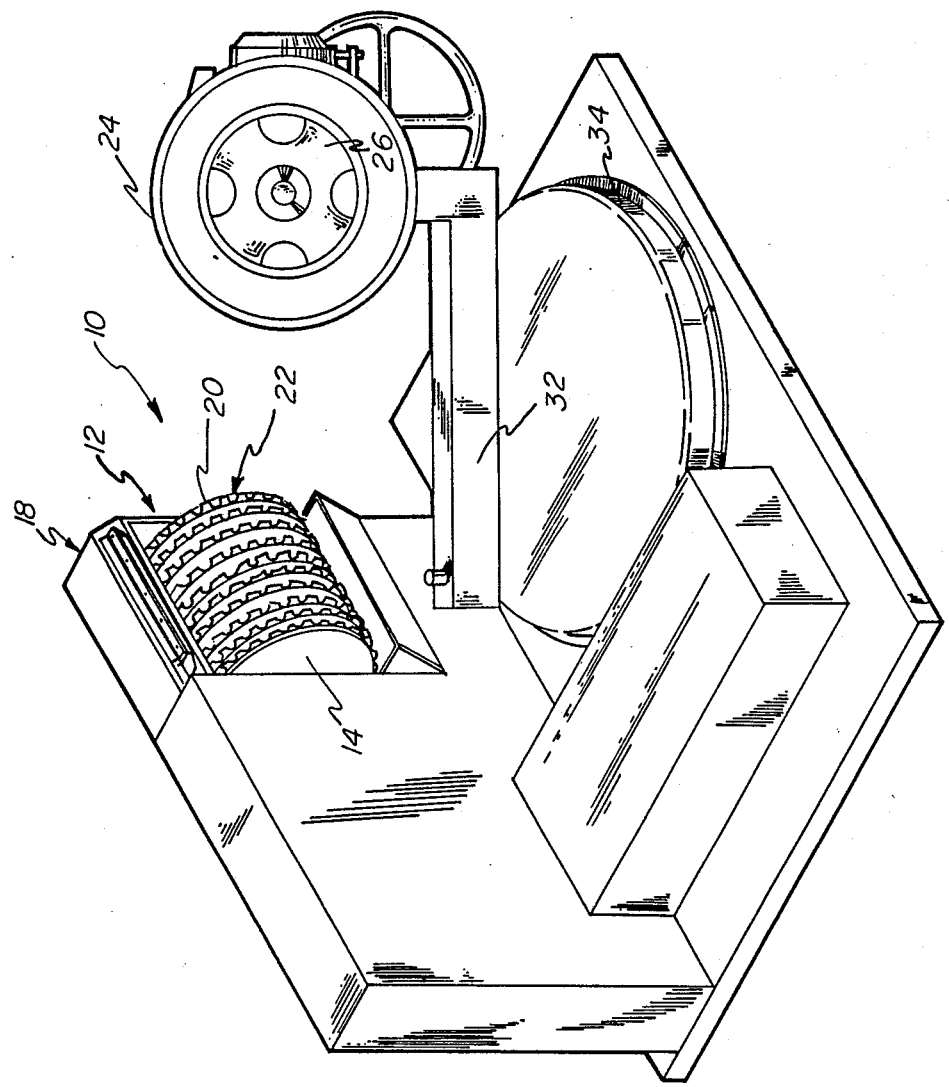
FIG. 1 is a perspective view of a tire buffing machine in accordance with the present invention.

A typical tire buffing machine, generally designated 10, is shown in FIGS. 1 and 2 having a rasp 12 of conventional construction comprising a drum 14 which is rotated about a shaft 16 (FIG. 3) by a motor (not shown) and supported on a support frame 18. The drum 14 includes a plurality of blades 20 or the like extending outwardly beyond its outer surface 22.

A tire 24, which is to have its old worn tread material removed, is concentrically mounted on an expandable hub assembly 26 having a shaft 28 which is rotatably driven by a conventional continuous drive motor 30.

The expandable hub assembly 26 is pivotally mounted to a swing arm 32 which is guided by a template 34 for swinging the tire 24 into position for contacting blades 20 of the rasp 12. The shaft 28 is longitudinally expandable to move the hub assembly 26 transversely relative to the rasp 12 so that the buffing action is conducted across the full width or surface of the tire periphery.

As shown in more detail in FIGS. 3 and 4, the rasp 12 is partially enclosed by a shroud or cowl 36 and is connected to an exhaust system indicated generally at 38 which withdraws some of the smoke, dust, chips, tread particles and the like emitted from the action of the rasp 12 on the tire 24. However, much of the pollution emitted during the buffing process is able to escape into the atmosphere through the front opening 40 in the shroud 36. This pollution can create serious health and environmental problems. Therefore, to reduce these problems, a pollution reducing assembly 42 is mounted to the upper panel 44 of the shroud 36 by a mount 46.

Figure 5:
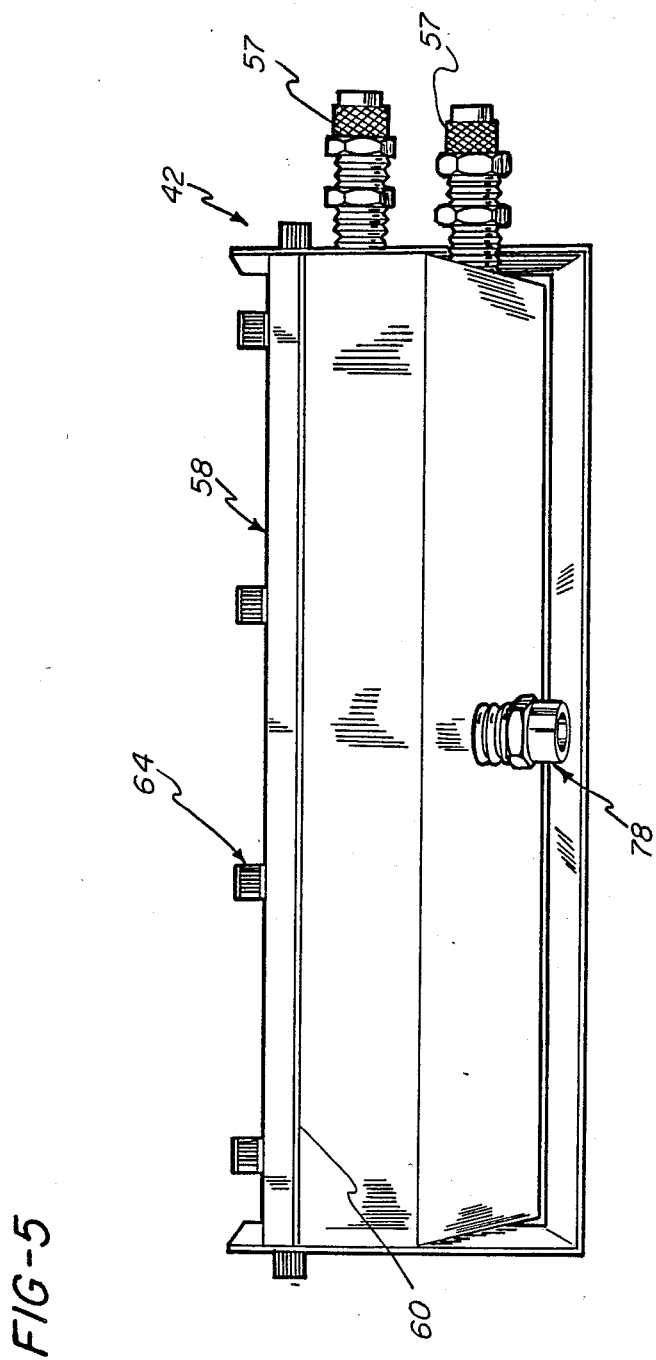
FIG. 5 is a detail perspective view of the pollution reducing assembly of FIGS. 3 and 4.
Figure 6:
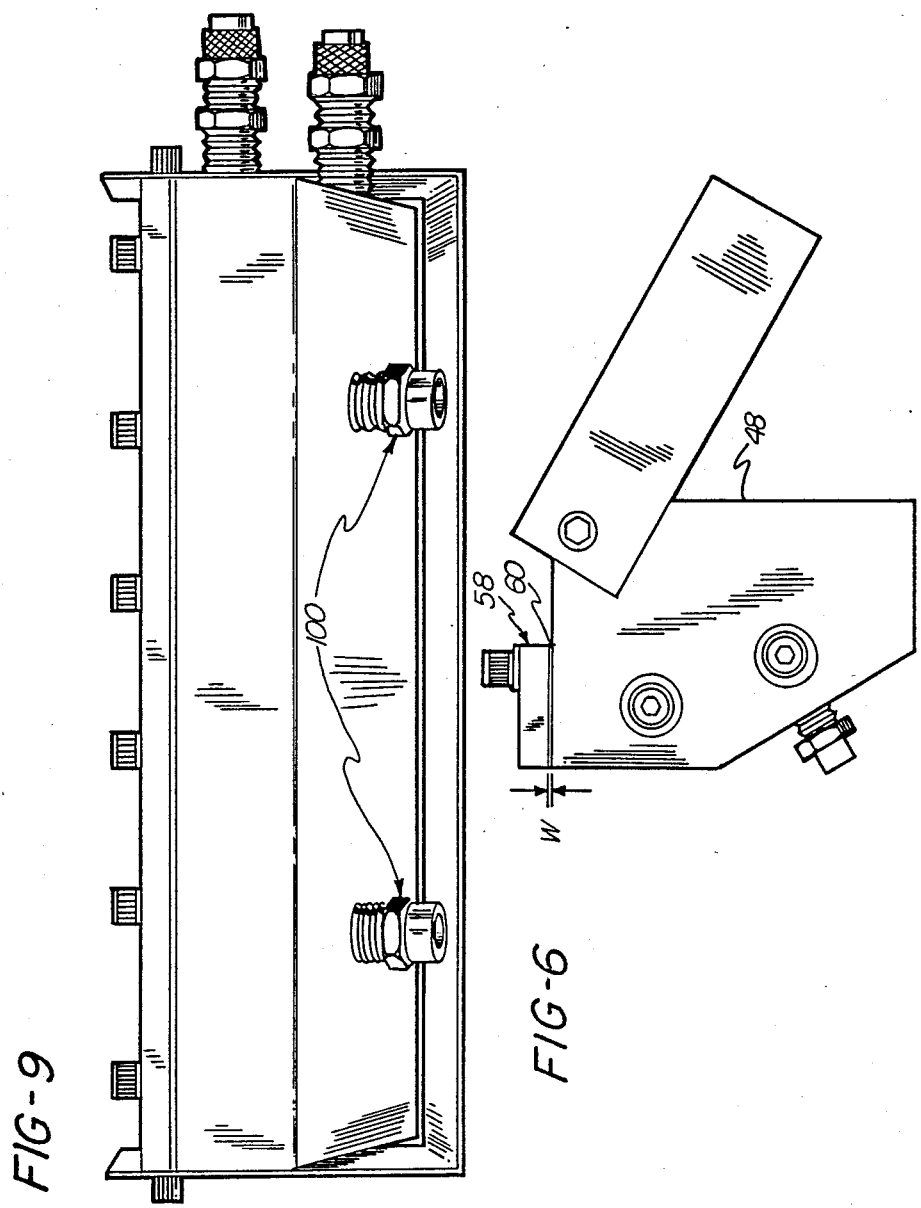
FIG. 6 is a detail side view of the pollution reducing assembly of FIGS. 3 through 5.
Figure 7:
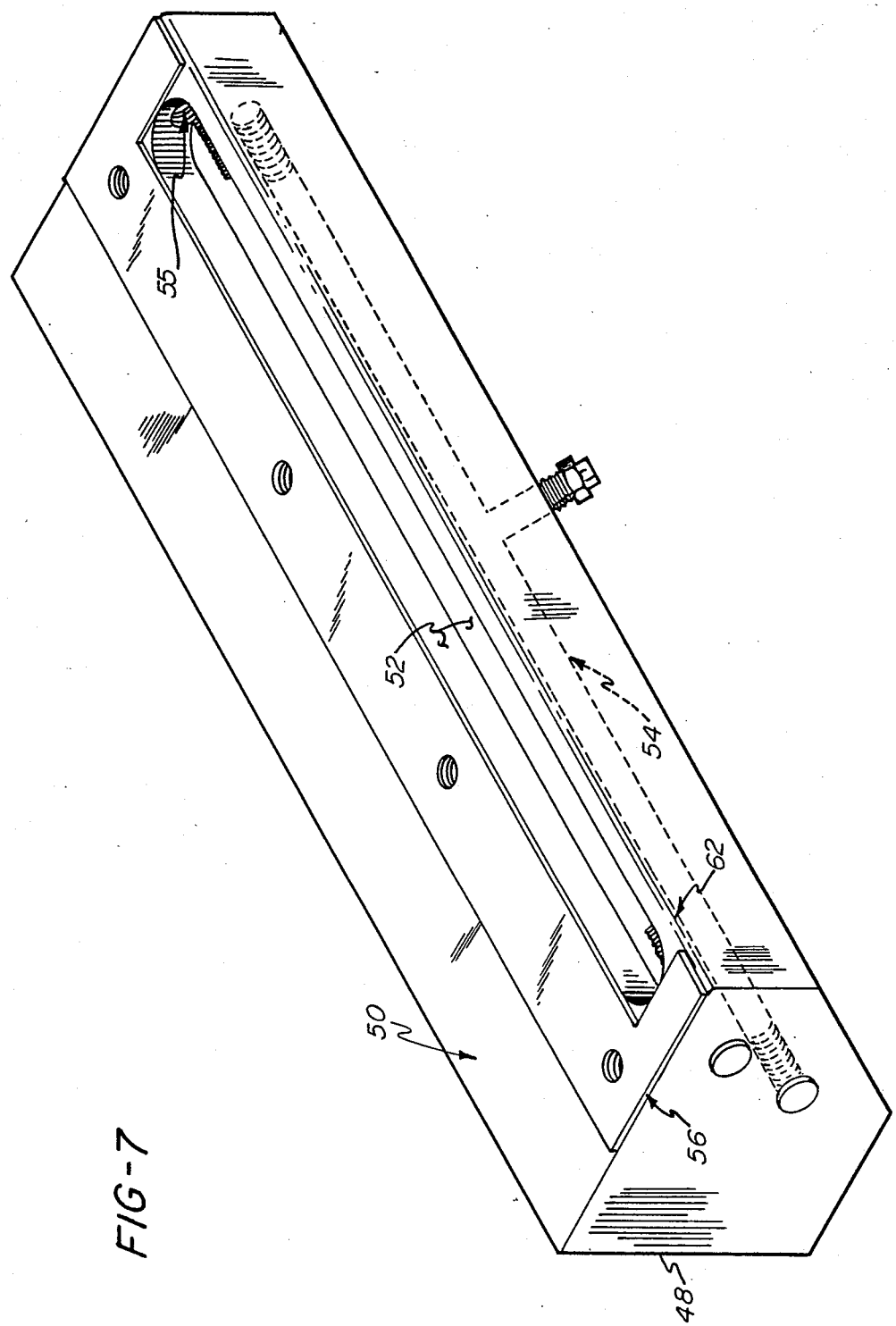
FIG. 7 is a detail perspective view of the pollution reducing assembly of FIGS. 3 through 6 with the cover plate removed and the water passage in phantom.

As shown in FIGS. 5, 6 and 7 the pollution reducing assembly 42 comprises a casing 48 formed from a stainless steel, aluminum, or other corrosion resistant material. The casing includes a generally flat surface 50, an inner longitudinally extending air plenum 52, and an inner water passage 54 (shown in phantom) each having at least one threaded inlet end 55 for attaching a connector 57. An inner plate 56 formed from 0.002–0.004 inch brass shim stock or the like extends longitudinally along the flat surface 50, leaving the air plenum 52 exposed, to properly space a cover plate 58 from the flat surface 50 and to form a longitudinally extending slot 60 along the front forward edge 62 of the casing 48. The cover plate 58 and the inner plate 56 are attached to the casing 48 by a plurality of bolts 64 allowing easy removal of the plate 58.

The front forward edge 62 of casing 48 is machine rounded to about a 3/16 inch radius and cooperates with the longitudinally extending slot 60 to form an air nozzle to direct a narrow air stream curtain as represented by arrows 66, from the slot 60 along an unducted path, and across the cutting width of the rasp 12 and onto the blades 20 immediately ahead of the grinding area 70 on the tire 12. The air stream curtain functions as an air wall or curtain to contain dust or other small tread particles produced during buffing within the interior of the shroud 36 thereby preventing them from escaping into the atmosphere. It should be noted that the slot width w (FIG. 6) can be varied to attain the proper air flow rate and velocity by removing the cover plate 58 and replacing the inner plate 56 with a larger or smaller gauge inner plate 56.

Figure 8:
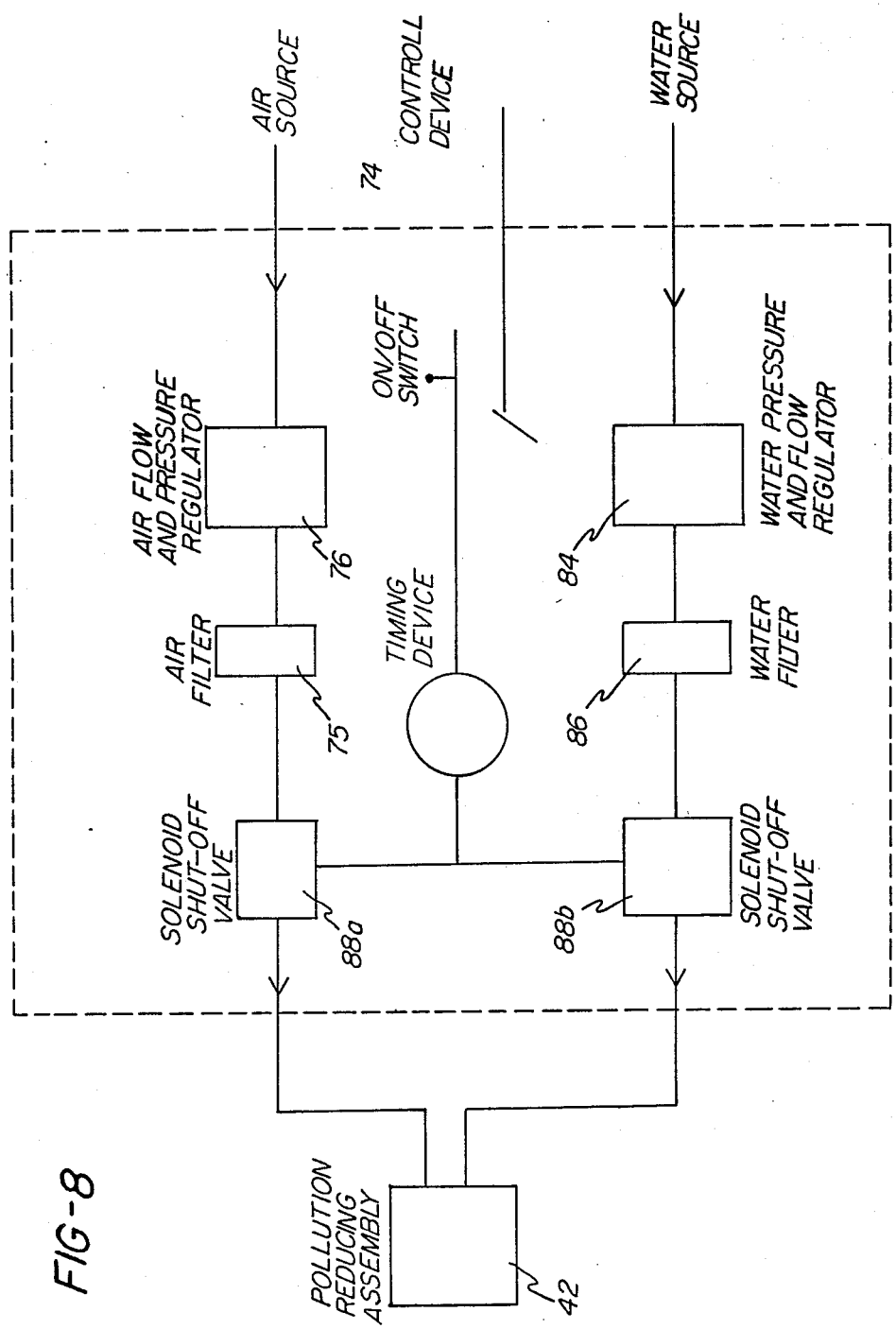
FIG. 8 is a schematic plan view showing the air and water control device.

As shown in FIGS. 3, 4 and 8, the longitudinally extending air plenum 52 is connected by piping 72 to a control device generally designated 74, having an air filter 75 and an air flow and pressure regulator 76 which in turn is connected to a source of air under pressure (not shown).

A spray nozzle 78 in flow communication with the inner water passage 54 is mounted on the casing 48 for supplying a fine atomized water spray or mist 80 between the air curtain 66 and the rasp blades 20. The mist 80 mixes easily with the air and functions to congeal or coagulate the dust and small tread particles into larger size particles which are more efficiently handled by the exhaust system 38. In addition, the water will cling to the rasp blades 20 to effectively lubricate the blades 20 as they cut or grind off the rubber tread from the tire 24 thereby reducing smoke caused by friction. In addition, the mist provides an effective cooling means for reducing the temperature of the chips and the dust below their ignition point thereby eliminating potential fire hazards.

Figure 10:
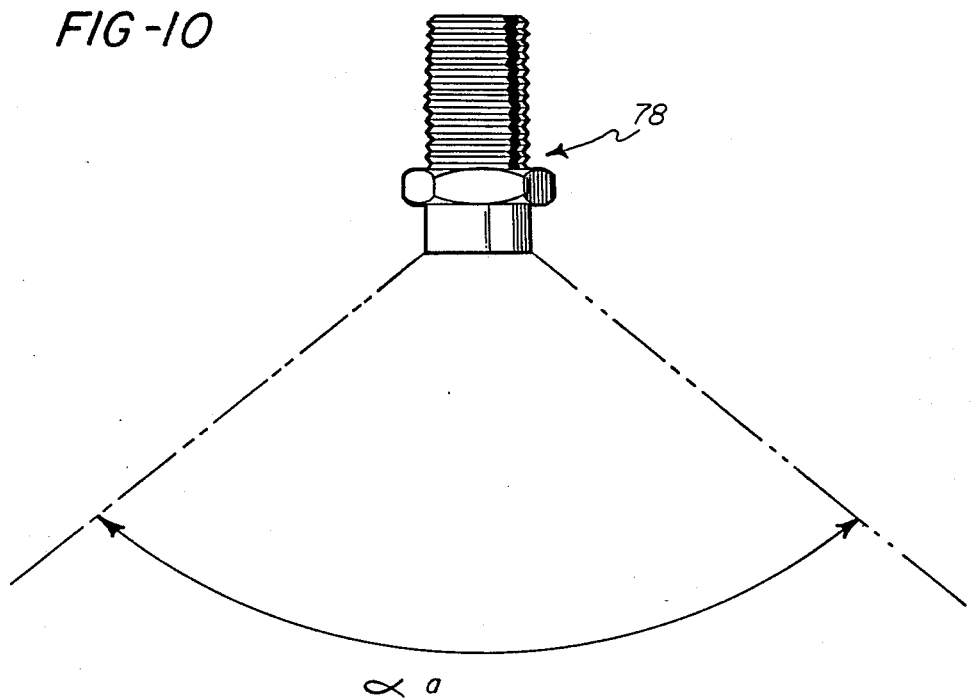
FIG. 10 is a detailed view of a nozzle for the pollution reducing assembly using a single nozzle.

As shown in FIGS. 8 and 10, the nozzle 78 and the inner water passage 54 (FIG. 7) is connected by piping 82 to the control device 74 having a water pressure and flow regulator 84 and an inline water filter 86 which in turn is connected to a source of water under pressure (not shown). The nozzle 78 is of conventional design for spraying a fan shaped mist 80 having an orifice angle a of about 110° for spraying approximately 0.10–0.14 gallons of water per minute at a pressure range between about 20–40 pounds per square inch.

The air filter and air flow and pressure regulator 76 in the control device 74 is of conventional design and can be varied to minimize air usage. It has been found that to form the air curtain 66 a minimum air pressure of about 20 psig is required with a preferred average operating pressure of about 80–100 psig. The water pressure and flow regulator 84 in the control device 74 for controlling the amount of water and the droplet size and consistency forming the mist 80 is of conventional design. It has been found that the preferred operating water pressure should be about 20–40 psi.

The air flow system and the water flow system each include a solenoid operated shut-off valve 88a and 88b respectively, which are controlled by an electronic timing device generally designated 90. The timing device 90 can be operated to allow the air valve 88a to remain open to continue the air curtain 66 after the water mist 80 has been turned off to reduce the amount of stray buffing dust or small tread material escaping into the atmosphere after buffing has been completed and to dry any residual water on the water nozzle 78. The control device 74 further includes a manual on/off switch 92 which controls the electrical power entering the control device 74 allowing the operator control over the buffing conditions.

Figure 11:
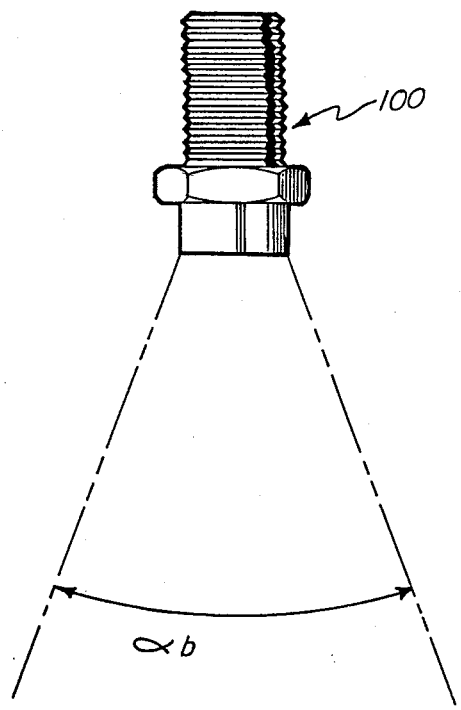
FIG. 11 is a detailed view of a nozzle for the pollution reducing assembly using a pair of nozzles.

It should be noted that the present invention is not limited to a particular rasp or tire buffing design, but rather, it can be incorporated for use with most conventional tire buffing machines and/or rasp designs. Furthermore, to accommodate buffing machines having larger size rasps, it may be desirable to replace the single spray nozzle by a pair of spray nozzles 100 as shown in FIGS. 9 and 11. In this embodiment of the subject invention, each nozzle 100 has an orifice angle b of about 50 degrees so that the spray therefrom envelops the full cutting width of the rasp using approximately 0.14–0.20 gallons of water per minute at a pressure range between about 20–40 pounds per square inch.

Thus in operation, a tire is brought into position for contacting the blades of a rotating rasp. The operator using the air and water control device can adjust the air pressure to direct a narrow air stream curtain along an unducted path and across the cutting width of the rasp and onto the blades immediately ahead of the grinding area of the tire. The operator then using the air and water control device can adjust the water flow and pressure to direct a water mist between the air curtain and the rasp blades for mixing with the air to congeal or coagulate any dust and small tread particles created during the buffing process into larger size particles.

While the method herein described, and the form of apparatus for carrying this method into effect, constitute preferred embodiments of this invention, it is to be understood that the invention is not limited to this precise method and forms of apparatus, and that changes may be made either without departing from the scope of the invention, which is defined in the appended claims.

What is claimed is:

1. A pollution reducing apparatus for a tire buffing machine having a rasp, the apparatus comprising:
   means for supplying a curtain of air directed across a portion of the rasp; and
   means for spraying water under pressure between said rasp and said air curtain.

2. A pollution reducing apparatus for a tire buffing machine having a rasp, the apparatus comprising:
   a casing having an inner air plenum and a slot in flow communication with said air plenum for directing an air curtain across a portion of the rasp;
   air supply means for supplying air under pressure to said air plenum; and
   means for directing a spray of water between said rasp and said air curtain.

3. The pollution reducing apparatus of claim 2 further comprising:
   means for adjusting the pressure of the air in said inner air plenum; and
   means for adjusting the pressure of said spray of water.

4. The pollution reducing apparatus of claim 2 further comprising timing means for allowing said air curtain to continue to operate after said spray of water is turned off.

5. The pollution reducing apparatus of claim 2 wherein said spray of water is in the form of a mist.

6. A pollution reducing apparatus for a tire buffing machine having a rasp, the apparatus comprising:
   a casing having an upper generally flat surface, an inner longitudinally extending air plenum, and an inner water passage;
   an inner plate extending longitudinally along said flat surface;
   a cover plate spaced from said flat surface by said inner plate, said cover plate and said flat surface forming a longitudinally extending slot in flow communication with said air plenum for directing a curtain of air across a portion of the rasp;
   air supply means for supplying air under pressure to said air plenum;
   water supply means for supplying water under pressure to said inner water passage; and
   nozzle means in flow communication with said inner water passage for directing a spray of water into the air curtain.

7. The polution reducing apparatus of claim 6 wherein said spray of water is in the form of a mist.

8. The pollution reducing apparatus of claim 6 wherein the width of said slot being about 0.002–0.004 inches.

9. The pollution reducing apparatus of claim 6 wherein the width of said slot is adjustable.

10. The pollution reducing apparatus of claim 6 wherein said casing is mounted to the tire buffing machine by an adjustable mount.

11. A tire buffing machine comprising:
    an expandable drum means for receiving a tire;
    a frame;
    a rasp rotatably mounted to said frame;
    means for rotating the rasp and for bringing the tire into engagement with the rasp; and
    pollution control means mounted to said frame having means for forming and directing an air curtain along a portion of the rasp and having means for directing a water spray into the air curtain.

12. The tire buffing machine of claim 11 wherein said water spray is in the form of a mist.

13. The tire buffing machine of claim 11 further comprising:
    means for adjusting the air pressure of said air curtain; and
    means for adjusting the water pressure of said water spray.

14. A method of reducing pollution during tire buffing comprising the steps of:
    placing a tire into position for contacting the blades of a rotating rasp and defining a tread grinding area;
    directing a narrow air stream curtain across the cutting width of the rasp and onto the blades immediately ahead of the tread grinding area; and
    directing a water mist between the air curtain and the rasp blades for mixing with the air to congeal or coagulate dust and tread particles created during buffing into larger size particles.

* * * * *